United States Patent [19]

Kihara et al.

[11] Patent Number: 4,735,990

[45] Date of Patent: Apr. 5, 1988

[54] AQUEOUS RESIN EMULSION

[75] Inventors: Yasuo Kihara; Kenjiro Mori; Takashi Kawasaki; Keiichi Ushiyama, all of Osaka, Japan

[73] Assignee: Nitto Electric Industrial Co., Ltd., Osaka, Japan

[21] Appl. No.: 911,536

[22] Filed: Sep. 25, 1986

Related U.S. Application Data

[63] Continuation of Ser. No. 791,273, Oct. 25, 1985, Pat. No. 4,666,977.

[30] Foreign Application Priority Data

Oct. 24, 1984 [JP]  Japan ................................ 59-225281

[51] Int. Cl.[4] .............................................. C08L 27/12
[52] U.S. Cl. ..................................... 524/805; 524/544; 526/245
[58] Field of Search ................. 524/544, 805; 526/245

[56] References Cited

U.S. PATENT DOCUMENTS

| | | | |
|---|---|---|---|
| 3,102,103 | 8/1963 | Ahlbrecht et al. | 524/805 |
| 3,277,039 | 10/1966 | Maraseia et al. | 524/805 |
| 3,462,296 | 8/1969 | Raynolds et al. | 524/544 |
| 3,514,420 | 5/1970 | Katsushima et al. | 524/544 |
| 3,822,228 | 11/1974 | Petrella et al. | 260/29.6 F |
| 3,838,083 | 9/1974 | Ukihashi et al. | 524/805 |
| 3,920,614 | 11/1975 | Kirimoto et al. | 524/805 |
| 4,043,965 | 8/1977 | Dickson | 524/805 |

FOREIGN PATENT DOCUMENTS

| | | | |
|---|---|---|---|
| 2406781 | 8/1975 | Fed. Rep. of Germany | 524/544 |
| 45-01271 | 1/1970 | Japan | 526/245 |
| 0034867 | 3/1983 | Japan | 526/245 |
| 0185606 | 10/1983 | Japan . | |
| 0185607 | 10/1983 | Japan | 526/245 |
| 1188815 | 4/1970 | United Kingdom | 526/245 |

Primary Examiner—Joseph L. Schofer
Assistant Examiner—J. M. Reddick
Attorney, Agent, or Firm—Sughrue, Mion, Zinn, Macpeak, and Seas

[57] ABSTRACT

An aqueous resin emulsion is disclosed. The emulsion is obtained by emulsion copolymerizing a monomer mixture comprising (a) an acrylic acid fluoroalkyl ester derivative, (b) an acrylic acid derivative, and (c) a polyfunctional monomer for internal cross-linking, in an aqueous medium. The emulsion shows excellent polymerization stability in emulsion copolymerization for the preparation thereof and excellent dispersion stability in an aqueous medium.

12 Claims, No Drawings

AQUEOUS RESIN EMULSION

This is a continuation of application Ser. No. 791,273 filed Oct. 25, 1985 now U.S. Pat. No. 4,666,977.

FIELD OF THE INVENTION

This invention relates to an aqueous resin emulsion, and more particularly to an aqueous resin emulsion which can be prepared with excellent polymerization stability and whose resin particles have excellent dispersion stability in an aqueous medium, particularly a buffer solution, physiological saline, or an aqueous solution containing a high polymer solute.

BACKGROUND OF THE INVENTION

Typically employed aqueous resin emulsions have been prepared by emulsion polymerization of a water sparingly soluble radical-polymerizable monomer, such as styrene, in the presence of an emulsifying agent and a water-soluble radical polymerization initiator. The emulsifying agent used is generally effective for ensuring polymerization stability in emulsion polymerization and for obtaining an aqueous resin emulsion having a small particle size and dispersion stability. The mechanism of the emulsifying agent to increase dispersion stability of the resulting emulsion has not been fully elucidated, but it is thought that an adsorption-desorption equilibrium is established in the emulsion between a part of the emulsifying agent adsorbed onto emulsion particles and the rest of the emulsifying agent present in the emulsion in a free state, and dispersion stability of the emulsion can thus be realized. Therefore, when an aqueous emulsion containing an emulsifying agent is dispersed in a buffer solution or physiological saline, the aforesaid adsorption-desorption equilibrium of the emulsifying agent in the resin emulsion is disturbed, and, as a result, stability of the resin emulsion is reduced, which readily leads to agglomeration or sedimentation of resin particles. In addition, since a polystyrene emulsion comprises hydrophobic resin particles, agglomeration of resin particles readily occurs when it is dispersed in a buffer solution or physiological saline containing an organic solute.

There is known a process of obtaining an aqueous resin emulsion in which a methacrylic ester is emulsion copolymerized with hydrophilic methacrylic acid, 2-hydroxyethyl methacrylate and a polyfunctional monomer for internal cross-linking in the presence of a water-soluble radical polymerization initiator and an emulsifying agent, as disclosed in *Polymer,* Vol. 19, pp. 867–871 (Aug., 1978). However, the emulsion obtained by this process also contains an emulsifying agent, and, therefore, involves the same problem as mentioned above. Further, the above described emulsion has a tendency that resin particles are readily agglomerated especially upon dispersing in a buffer solution, etc., presumably because the copolymer particles have a hydroxyl group.

For eliminating the above described problem, there has been proposed a process of obtaining an acrylic ester emulsion in the absence of an emulsifying agent as disclosed by Kagaku Gijutsu Kenkyusho Report, Vol. 75, No. 8, p. 341 (1980). However, the resin emulsion obtained by this process is still unsatisfactory in terms of dispersion stability, and, in particular, easily undergoes agglomeration under mechanical shear stresses.

The present invention has been accomplished in order to overcome the above described disadvantages.

SUMMARY OF THE INVENTION

Accordingly, an object of this invention is to provide an aqueous resin emulsion comprising an acrylic ester derivative and an acrylic acid derivative as monomer components, which shows excellent polymerization stability in emulsion polymerization for the preparation thereof without an aid of an emulsifying agent and whose resin particles have a narrow and uniform size distribution and retain a stably dispersed state in an aqueous medium, which, therefore, can suitably be used in an aqueous medium in a stably dispersed state.

Accordingly, the present invention is directed to an aqueous resin emulsion prepared by emulsion copolymerization of:

(a) from 60 to 99.8% by weight of an acrylic acid fluoroalkyl ester derivative represented by formula (I)

$$CH_2=CR^1COOR^2(CF_2)_nCFA_2 \qquad (I)$$

wherein $R^1$ represents a hydrogen atom or a lower alkyl group, $R^2$ represents a group of the formula $-CH_2-_m$ or a group of the formula

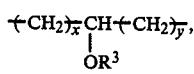

wherein m represents 0 or an integer of from 1 to 12 and x+y is an integer of from 1 to 11, n represents 0 or an integer of from 1 to 12, and $R^3$ represents a hydrogen atom or an acetyl group, and A independently represents a hydrogen atom, a fluorine atom, or $CF_3$, (b) from 0.1 to 20% by weight of an acrylic acid derivative represented by formula (II)

$$R^4CH=CR^5COOH \qquad (II)$$

wherein $R^4$ represents a hydrogen atom, a lower alkyl group or a carboxyl group, and $R^5$ represents a hydrogen atom or a lower alkyl group, and (c) from 0.1 to 20% by weight of a polyfunctional monomer for internal cross-linking, in an aqueous medium.

DETAILED DESCRIPTION OF THE INVENTION

The acrylic acid fluoroalkyl ester derivative represented by formula (I) which can be used in this invention preferably includes compounds represented by formulae (I-a) through (I-d)

| | |
|---|---|
| $CH_2=CR^1COO(CH_2)_m(CF_2)_nCF_3$ | (I-a) |
| $CH_2=CR^1COO(CH_2)_m(CF_2)_nH$ | (I-b) |
| $CH_2=CR^1COO(CH_2)_m(CF_2)_nCF(CF_3)_2$ | (I-c) |
| $CH_2=CR^1COOCH_2CHCH_2(CF_2)_nCF_3$<br>       $\quad\quad\quad\quad\quad\quad\quad\quad\quad |$<br>       $\quad\quad\quad\quad\quad\quad\quad\quad\quad OR^3$ | (I-d) | wherein $R^1$, m, n, and $R^3$ are as defined above.

In the above described formulae (I) and (I-a) to (I-d), $R^1$ preferably represents a hydrogen atom or a methyl group.

Specific examples of particularly preferred acrylic acid fluoroalkyl ester derivatives are $CH_2=C(CH_3)COOCH_2CF_3$ $CH_2=C(CH_3)COOCH_2(CF_2)_2H$ $CH_2=C(CH_3)COOCH_2(CF_2)_4H$ $CH_2=C(CH_3)COO(CH_2)_2(CF_2)_8F$ In the present invention, an emulsion copolymer of the acrylic acid fluoroalkyl ester derivative (I) having excellent dispersion stability in an aqueous medium can be obtained by emulsion copolymerizing the ester derivative (I) with an acrylic acid derivative of the formula (II) and a polyfunctional monomer for internal cross-linking. According to this invention, a monomer mixture comprising these monomer components at a prescribed proportion can be emulsion-copolymerized in a stable state unaccompanied by agglomeration of resin particles without using any emulsifying agent, to thereby obtain an aqueous resin emulsion which remains stably dispersed in an aqueous medium and is free from stains or imbibition (swelling).

In formula (II) representing the acrylic acid derivative used in the present invention, $R^4$ preferably represents a hydrogen atom or a methyl group, and $R^5$ preferably represents a hydrogen atom or a methyl group. Specific examples of preferred acrylic acid derivatives include acrylic acid, methacrylic acid, itaconic acid, crotonic acid, maleic acid, fumaric acid, a maleic acid monoalkyl ester, a fumaric acid monoalkyl ester, an itaconic acid monoalkyl ester, etc. Of these, acrylic acid, methacrylic acid and itaconic acid and mixtures thereof are particularly preferred.

The polyfunctional monomer for internal cross-linking is particularly effective to render resin particles non-swelling thereby ensuring dispersion stability of resin particles in an aqueous medium. Such a polyfunctional monomer preferably includes a poly(meth)acrylate (that is, polyacrylate and polymethacrylate) of an aliphatic polyhydric alcohol. Specific examples are ethylene glycol dimethacrylate, diethylene glycol dimethacrylate, triethylene glycol dimethacrylate, dipropylene glycol dimethacrylate, 1,3-butylene glycol dimethacrylate, triethylene glycol diacrylate, trimethylolpropane trimethacrylate, trimethylolpropane triacrylate, tetramethylolmethane tetraacrylate, etc. In addition, divinylbenzene, N,N'-methylenebisacrylamide, etc., may also be used as polyfunctional monomer for internal cross-linking.

The monomer mixture which can be used for emulsion polymerization in the present invention comprises (a) from 60 to 99.8% by weight, and preferably from 70 to 95% by weight, of an acrylic acid fluoroalkyl ester derivative, (b) from 0.1 to 20% by weight, and preferably from 1 to 15% by weight, of an acrylic acid derivative, and (c) from 0.1 to 20% by weight, and preferably from 1 to 10% by weight, of a polyfunctional monomer for internal cross-linking.

The acrylic acid derivative as component (b) is a monomer essentially required for achieving polymerization stability in emulsion copolymerization of the acrylic acid fluoroalkyl ester derivative as component (a) and stability of the resulting emulsion. It is required for effective manifestation of these effects that the acrylic acid derivative be present in the monomer mixture in an amount of at least 0.1% by weight. It should be noted, however, that use of this monomer component in excess results, rather, in reduction of polymerization stability and stability of the resulting emulsion. Hence, the upper limit of the acrylic acid derivative is 20% by weight.

The polyfunctional monomer for internal cross-linking as component (c) is also a monomer necessary to achieve stable progress of polymerization and to maintain a stable dispersed state of the resulting resin particles as well as to make the resin particles non-swelling. This monomer component should be used in an amount of at least 0.1% by weight in the monomer mixture. Too large an amount of this monomer component unfavorably impairs polymerization stability and stability of the resulting emulsion.

For the purpose of further improving polymerization stability in the emulsion copolymerization of the above-described monomer mixture and aqueous dispersion stability of the resin particles, a part of the aforesaid acrylic acid fluoroalkyl ester derivative can be replaced by an acrylic acid alkyl ester derivative represented by formula (III)

$$CH_2=CR^6COOR^7 \qquad (III)$$

wherein $R^6$ represents a hydrogen atom or a lower alkyl group, and preferably a hydrogen atom or a methyl group; and $R^7$ represents an alkyl group having from 1 to 8 carbon atoms.

The amount of the above-described monomer component of formula (III) should be not more than 90% by weight based on the mixture of the acrylic acid fluoroalkyl ester derivative (I) and the acrylic acid alkyl ester derivative (III). Amounts exceeding 90% by weight rather deteriorate polymerization stability and also reduce aqueous dispersion stability of the resulting resin particles. A lower limit of the effective amount of the monomer component (III) is not particularly restricted, but is usually 1% by weight based on the mixture of (I) and (III). A preferred amount of the acrylic acid alkyl ester derivative (III) ranges from 10 to 90% by weight on the same basis.

Further, the resin emulsion of this invention may additionally contain a vinyl monomer having a sulfonic acid group for the purpose of further improving polymerization stability in emulsion copolymerization for the preparation of the resin emulsion, and improving stability of the resulting emulsion.

The vinyl monomer having a sulfonic acid group which can be used in the present invention includes alkylenesulfonic acids or alkali metal salts thereof, e.g., sodium ethylenesulfonate; sulfoalkyl acrylates or alkali metal salts thereof represented by formula (IV)

$$CH_2=CR^8COOR^9SO_3M \qquad (IV)$$

wherein $R^8$ represents a hydrogen atom or a lower alkyl group, and preferably a hydrogen atom or a methyl group; $R^9$ represents an alkylene group having from 1 to 6 carbon atoms, and preferably from 1 to 3 carbon atoms; and M represents a hydrogen atom, an alkali metal, or ammonium, e.g., sulfopropyl (meth)acrylate; styrenesulfonic acid, derivatives thereof or alkali metal salts thereof represented by formula (V)

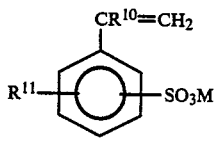

wherein $R^{10}$ represents a hydrogen atom or a lower alkyl group, and preferably a hydrogen atom or a methyl group; $R^{11}$ represents a hydrogen atom or a lower alkyl group; and M is as defined above, e.g., sodium styrenesulfonate; 2-acrylamidoalkanesulfonic acids, derivatives thereof or alkali metal salts thereof represented by formula (VI)

$$CH_2=CR^{12}CONH-R^{13}-SO_3M \qquad (VI)$$

wherein $R^{12}$ represents a hydrogen atom or a lower alkyl group, and preferably a hydrogen atom or a methyl group; $R^{13}$ represents an alkylene group having from 1 to 6 carbon atoms, and preferably from 3 to 4 carbon atoms; and M is as defined above, e.g., 2-acrylamido-2-methylpropanesulfonic acid; and the like.

The above described vinyl monomer having a sulfonic acid group is desirable for improving polymerization stability in emulsion copolymerization for the preparation of the aqueous resin emulsion of this invention and stability of the resulting emulsion. For effective manifestation of these effects, this monomer component is preferably used in an amount of from 0.001 to 10% by weight based on the total monomer mixture. Too large an amount of this vinyl monomer rather reduces polymerization stability and stability of the resulting emulsion.

Furthermore, a part of the aforesaid acrylic acid fluoroalkyl ester derivative of formula (I) may be replaced with a radical copolymerizable vinyl monomer other than the aforesaid acrylic acid derivatives, the vinyl monomers having a sulfonic acid group, or the polyfunctional monomer for internal cross-linking.

Such a radical copolymerizable vinyl monomer to be used as a monomer component includes, for example, hydrophobic monomers, homopolymers of which are water-insoluble. Specific examples of such hydrophobic monomers are α-olefins or halogen-substituted α-olefins, e.g., ethylene, propylene, vinyl chloride, etc.; alkenylbenzenes, e.g., styrene, methylstyrene, ethylstyrene, vinyltoluene, chlorostyrene, etc.; conjugated diolefins, e.g., butadiene, isoprene, etc.; (meth)acrylic esters, e.g., (meth)acrylonitrile, methyl (meth)acrylate, ethyl (meth)acrylate, propyl (meth)acrylate, butyl (meth)acrylate, hexyl (meth)acrylate, octyl (meth)acrylate, etc.; vinyl acetate; viny propionate; and the like. Preferred among them are alkenylbenzenes and (meth)acrylic esters.

In addition, hydrophilic monomers, homopolymers of which are water-soluble or water-swelling can also be used as the radical copolymerizable vinyl monomer. Specific examples of such hydrophilic vinyl monomers include hydroxyalkyl (meth)acrylates, e.g., hydroxymethyl (meth)acrylate, hydroxyethyl (meth)acrylate, hydroxypropyl (meth)acrylate, etc.; (meth)acrylamide; glycidyl (meth)acrylate; and the like. These hydrophilic monomers are particularly effective to introduce a functional group into the resulting resin particles, and are preferably used in combination with the aforesaid hydrophobic vinyl monomers.

In the present invention, the acrylic acid fluoroalkyl ester derivative of formula (I) is an essential monomer component in order to maintain stable dispersibility in an aqueous medium also in the cases when a reactive functional group is introduced to emulsion particles or the emulsion is added to a solution containing a high polymeric solute. To the contrary, the above described radical copolymerizable vinyl monomer, when used in a large amount, deteriorates not only polymerization stability in emulsion copolymerization but also aqueous dispersion stability of the resulting resin particles. Therefore, the acrylic acid fluoroalkyl ester derivatives (I) should be used in an amount of at least 1% by weight based on the total amount of the acrylic acid fluoroalkyl ester derivative (I) and the aforesaid radical copolymerizable vinyl monomer.

In other words, the above-described radical copolymerizable vinyl monomer is used in an amount not exceeding 99% by weight, and preferably not exceeding 97% by weight, based on the total weight of the radical copolymerizable vinyl monomer and the acrylic acid fluoroalkyl ester derivative (I), and, of the radical copolymerizable vinyl monomers, the hydrophilic monomer is used in an amount of not more than 30% by weight on the same basis.

The lower limit of the radical copolymerizable vinyl monomer is not particularly restricted and is appropriately selected depending on the particular purpose. Usually, the lower limit is 1% by weight based on the mixture of the acrylic acid fluoroalkyl ester derivative (I) and the radical copolymerizable vinyl monomer.

In a preferred embodiment of the present invention, a monomer mixture for preparing the aqueous resin emulsion comprises (a) from 60 to 99.8% by weight, and preferably from 70 to 95% by weight, of an acrylic acid fluoroalkyl ester derivative of formula (I), (b) from 0.1 to 20% by weight, and preferably from 1 to 15% by weight, of an acrylic acid derivative of formula (II), and (c) from 0.1 to 20% by weight, and preferably from 1 to 10% by weight, of a polyfunctional monomer for internal cross-linking.

The above described monomer mixture may further contain an acrylic acid alkyl ester derivative represented by formula (III)

$$CH_2=CR^6COOR^7 \qquad (III)$$

wherein $R^6$ and $R^7$ are as defined above, as a part of the acrylic acid fluoroalkyl ester derivative of formula (I).

In another preferred embodiment of the present invention, a monomer mixture for preparing the aqueous resin emulsion comprises (a) from 50 to 99.799% by weight, and preferably from 65 to 98.99% by weight, of an acrylic acid fluoroalkyl ester derivative of formula (I), (b) from 0.1 to 20% by weight, and preferably from 0.5 to 15% by weight, of an acrylic acid derivative of formula (II), (c) from 0.1 to 20% by weight, and preferably from 0.5 to 15% by weight, of a polyfunctional monomer for internal cross-linking, and (d) from 0.001 to 10% by weight, and preferably from 0.01 to 5% by weight, of a vinyl monomer having a sulfonic acid group.

The above described monomer mixture may further contain a radical copolymerizable vinyl monomer other than the components (b), (c), or (d) as a part of the component (a).

Though depending on a particular end use of the aqueous resin emulsion, the specific kind of each of the above described monomers constituting the monomer mixture can be selected so that the resulting copolymer may have a glass transition point of at least 0° C., and preferably at least room temperature. This is because when the glass transition point of the resin particles is lower than 0° C., the resin particles tend to be easily fused or agglomerated among themselves to thereby reduce dispersion stability.

In the present invention, the above-described monomer mixture is emulsion copolymerized in an aqueous medium in the presence of a water-soluble radical polymerization initiator in a usual manner, to thereby obtain an aqueous resin emulsion of a water-insoluble acrylic acid fluoroalkyl ester copolymer. In carrying out the emulsion copolymerization, it is preferred not to use an emulsifying agent because, as described before, if an emulsifying agent is present in the resulting aqueous emulsion in a free state or in a state adsorbed onto the resin particles, various adverse influences are exerted especially upon use of the emulsion. According to the present invention, a monomer mixture having the above-described composition can be stably copolymerized without aid of an emulsifying agent, and the dispersion state of the resulting resin emulsion can be stably maintained. However, as described above, use of an emulsifying agent is not deemed to be excluded as long as agglomeration or sedimentation of emulsion particles does not occur when the resulting emulsion is dispersed in a buffer solution or physiological saline. An emulsifying agent may well be used depending on the particular end use as far as it does not produce any adverse influences.

In carrying out emulsion copolymerization according to the present invention, a concentration of a monomer mixture in an aqueous medium is related to an average particle size of resin particles of the resulting emulsion, but is usually in the range of from 0.1 to 40% by weight. A polymerization initiator to be used is a water-soluble radical polymerization initiator. Preferred but not limiting examples of such polymerization initiator include persulfates, e.g., potassium persulfate, sodium persulfate, ammonium persulfate, etc.; and redox type polymerization initiators composed of the above-described persulfates and thiosulfates, e.g., sodium thiosulfate, potassium thiosulfate, sodium hydrogenthiosulfate, etc., or sulfites, e.g., sodium sulfite, potassium sulfite, sodium hydrogenthiosulfite, etc. These polymerization initiators are preferably used in amounts of from 0.01 to 1% by weight. The atmosphere of polymerization is also not particularly limited, but an oxygen-free inert gas atmosphere is preferably used. The polymerization temperature is not also particularly limited, but usually ranges from 20° to 100° C., and preferably from 40° to 90° C.

The resin particles of the aqueous emulsion of the present invention should have an average particle size falling within a range of from 0.03 to 2 $\mu$m, preferably from 0.05 to 2 $\mu$m, and more preferably from 0.1 to 1 $\mu$m. If the resin particle size is too small, it will create a difficulty in recovering the spent emulsion. On the other hand, too large a particle size makes it difficult to maintain a stable dispersion state of the emulsion.

The resin particles of the resin emulsion preferably have a specific gravity within a range of from 0.9 to 1.5, and more preferably from 0.9 to 1.3. If the specific gravity is smaller than 0.9, the resin particles are floated on the surface of the emulsion medium to deteriorate the dispersion stability. On the other hand, resin particles having a specific gravity of greater than 1.5 are sedimented in the emulsion medium to readily cause agglomeration.

As described above, according to the present invention, emulsion copolymerization of an acrylic acid fluoroalkyl ester derivative can be performed while ensuring polymerization stability without using an emulsifying agent. The copolymer particles thus formed have a narrow and uniform size distribution and are free from swelling or stains. Further, the resulting emulsion retains its stable dispersed state even when dispersed in a buffer solution or physiological saline and, therefore, can advantageously be used in applications requiring dispersion stability of resin particles in an aqueous medium.

In particular, since the resin particles in the aqueous resin emulsion according to the present invention contain the acrylic acid fluoroalkyl ester derivative, they can maintain a stable dispersibility in an aqueous medium even when a reactive functional group is introduced to the resin particles or the emulsion is mixed with a solution containing a high polymeric solute.

The present invention will now be illustrated in greater detail with reference to the following examples and comparative examples, but it is noted that these examples do not limit the present invention.

EXAMPLE 1

Sixty grams of a monomer mixture comprising 91.3 wt % of 2,2,2-trifluoroethyl methacrylate, 5.0 wt % of acrylic acid and 3.7 wt % of triethylene glycol dimethacrylate was added to 330 g of distilled water. To the mixture was added a polymerization initiator aqueous solution comprising 0.3 g of potassium persulfate and 10 ml of water at a temperature of 75° C. under a nitrogen stream, followed by stirring at 120 rpm for 7 hours to effect polymerization to a degree of polymerization of 99.7%. There was obtained an aqueous emulsion containing resin particles having an average particle size of 0.36 $\mu$m. The polymerization proceeded very stably with no agglomeration.

Determination of an agglomerate was carried out by cooling the produced resin emulsion to 30° C., filtering the emulsion using a filter cloth, drying the filter cake left on the filter cloth, and measuring the weight of the cake.

COMPARATIVE EXAMPLE 1

A monomer mixture containing an excessive amount of methacrylic acid as shown in Table 1 was emulsion copolymerized in the same manner as described in Example 1. The results obtained are shown in Table 1.

EXAMPLE 2

A monomer mixture comprising 18.9 wt % of 1H,1H, 5H-octafluoropentyl methacrylate, 36.2 wt % of methyl acrylate, 36.2 wt % of isobutyl methacrylate, 5.0 wt % of acrylic acid and 3.7 wt % of triethylene glycol dimethacrylate was emulsion copolymerized in the same manner as described in Example 1. The results obtained are shown in Table 1.

EXAMPLES 3 TO 8

A monomer mixture having the composition shown in Table 1 was emulsion copolymerized in the same manner as in Example 1. The results obtained are shown in Table 1.

COMPARATIVE EXAMPLES 2 TO 4

A monomer mixture containing no acrylic acid or polyfunctional monomer for internal cross-linking as shown in Table 1 was emulsion copolymerized in the same manner as in Example 1. The results obtained are shown in Table 1.

COMPARATIVE EXAMPLES 5 AND 6

A monomer mixture containing an excessive amount of a methacrylic ester or a polyfunctional monomer for internal cross-linking as shown in Table 1 was emulsion copolymerized in the same manner as in Example 1. The results obtained are shown in Table 1.

COMPARATIVE EXAMPLES 7 AND 8

A monomer mixture containing styrene as a monomer component as shown in Table 1 was emulsion copolymerized in the same manner as in Example 1. The results obtained are shown in Table 1.

In Table 1 below, the abbreviations used for the monomers have the following meanings:
3F: 2,2,2-Trifluoroethyl methacrylate
8F: 1H,1H,5H-Octafluoropentyl methacrylate
TGD: Triethylene glycol dimethacrylate
AA: Acrylic acid
MAA: Methacrylic acid
MMA: Methyl methacrylate
IBMA: Isobutyl methacrylate
St: Styrene The manner of determining the polymerization stability and the dispersion stability are described below.

cle size of 0.30 μm. The polymerization proceeded very stably with no agglomeration.

Determination of an agglomerate was carried out in the same manner as in Example 1.

The mono-dispersibility, stability in a high polymer solution, heat stability and modification stability of the resulting emulsion were evaluated by the methods hereinafter described, and the results obtained are shown in Table 3.

EXAMPLES 10 TO 18

A monomer mixture having the composition shown in Table 2 was emulsion copolymerized to a degree of polymerization of 95% or more in the same manner as described in Example 9. The properties of the resulting resin aqueous emulsion were determined in the same manner as in Example 9, and the results obtained are shown in Table 3.

COMPARATIVE EXAMPLES 9 TO 12

A monomer mixture containing no acrylic acid derivative, vinyl monomer having a vinyl group or a monomer for internal cross-linking as shown in Table 2 was emulsion copolymerized in the same manner as in Example 9 to obtain a resin aqueous emulsion.

The properties of the resulting resin aqueous emulsion were determined in the same manner as in Example 9, and the results obtained are shown in Table 3.

COMPARATIVE EXAMPLES 13 TO 15

A monomer mixture containing an excess of an acrylic acid derivative, a vinyl monomer having a vinyl

TABLE 1

| Example No. | Composition of Monomer Mixture (wt %) | | | | | | | | Polymerization Stability | Emulsion Property | |
|---|---|---|---|---|---|---|---|---|---|---|---|
| | 3F | 8F | MMA | IBMA | St | AA | MAA | TGD | | Average Particle Size (μm) | Dispersion Stability |
| Example 1 | 91.3 | — | — | — | — | 5.0 | — | 3.7 | stable | 0.36 | good |
| Example 2 | — | 18.9 | 36.2 | 36.2 | — | 5.0 | — | 3.7 | stable | 0.34 | good |
| Example 3 | — | 10 | 40.7 | 40.7 | — | 5.0 | — | 3.7 | stable | 0.29 | good |
| Example 4 | 10 | — | 33.5 | 33.5 | — | 15.0 | — | 8.0 | stable | 0.36 | good |
| Example 5 | 45.8 | — | 22.9 | 22.9 | — | 4.8 | — | 3.5 | stable | 0.36 | good |
| Example 6 | — | 10 | 35.2 | 35.2 | — | — | 15 | 3.7 | stable | 0.34 | good |
| Example 7 | — | 10 | 37.2 | 37.2 | — | 12.0 | — | 3.7 | stable | 0.36 | good |
| Example 8 | — | 20 | 31.9 | 31.9 | — | — | 15 | 1.2 | stable | 0.30 | good |
| Comp. Ex. 1 | — | 10 | 26.0 | 26.0 | — | — | 30 | 8.0 | agglomeration | — | agglomeration |
| Comp. Ex. 2 | 10 | — | 43.2 | 43.2 | — | — | — | 3.7 | stable | 0.31 | agglomeration |
| Comp. Ex. 3 | 10 | — | 37.5 | 37.5 | — | — | 15 | — | stable | 0.32 | agglomeration |
| Comp. Ex. 4 | 50 | — | 22.5 | 22.5 | — | 5.0 | — | — | stable | 0.36 | agglomeration |
| Comp. Ex. 5 | 0.5 | — | 45.6 | 45.6 | — | 4.8 | — | 3.5 | stable | 0.30 | agglomeration |
| Comp. Ex. 6 | 10 | — | 25.0 | 25.0 | — | 15.0 | — | 25.0 | gelation | — | — |
| Comp. Ex. 7 | 47.5 | — | — | — | 43.8 | 5.0 | — | 3.7 | stable | 0.31 | agglomeration |
| Comp. Ex. 8 | 0.5 | — | — | — | 90.8 | 5.0 | — | 3.7 | stable | 0.36 | agglomeration |

EXAMPLE 9

Sixty grams of a monomer mixture comprising 5.0 wt % of acrylic acid, 0.1 wt % of sodium styrenesulfonate, 10.0 wt % of 1H,1H,5H-octafluoropentyl methacrylate, 40.0 wt % of methyl methacrylate, 40.0 wt % of isobutyl methacrylate and 4.9 wt % of triethylene glycol dimethacrylate was added to 330 g of distilled water. To the mixture was added a polymerization initiator aqueous solution comprising 0.12 g of potassium persulfate and 10 ml of water at a temperature of 75° C. under a nitrogen stream, followed by stirring at 120 rpm for 7 hours to effect polymerization to a degree of polymerization of 99.9%. There was obtained an aqueous emulsion containing resin particles having an average partigroup or a monomer for internal cross-linking as shown in Table 2 was emulsion copolymerized in the same manner as in Example 9 to obtain a resin aqueous emulsion.

The properties of the resulting emulsion were determined in the same manner as in Example 9, and the results obtained are shown in Table 3.

Methods for evaluating various properties of the aqueous resin emulsion are as follows.

Mono-Dispersibility

Mono-dispersibility was determined in accordance with the following formula:

(Standard Deviation)/(Average Particle Size) × 100 (%)

Polymerization Stability

Polymerization stability was judged "good" when an agglomerate was observed only in a slight trace amount after completion of the polymerization, or otherwise designated as "agglomeration" (no gelation but agglomeration in an amount more than the trace amount) or "gelation" (agglomeration in an amount more than 90% of solid content).

Dispersion Stability

The emulsion was centrifuged, and the solid was washed with distilled water and then redispersed in distilled water. After adjusting to a pH of 7.0 with a 0.001 N sodium hydroxide aqueous solution, 1 ml of the resulting emulsion having a solid content of 5 wt % was dispersed in 10 ml of a 1 M calcium chloride aqueous solution (pH 7.0). The dispersion was judged to have good dispersion stability when the resin particles remained stably dispersed one day after the dispersing, or was judged to have undergone "agglomeration" when agglomeration of resin particles was observed within one day from the dispersing.

Stability in High Polymer Solution

One milliliter of the same emulsion having a solid content of 5 wt % and a pH of 8.0 as prepared above was dispersed in 10 ml of a 0.25 wt % polyethyleneimine aqueous solution (pH 8.0). The stability in a high polymer solution was judged "good" when the resin particles remained stably dispersed one day after the dispersing, or designated as "agglomeration" when agglomeration of particles was observed within one day from the dispersing.

Heat Stability

One milliliter of the same emulsion having a solid content of 5 wt % and a pH of 8.0 as prepared above was dispersed in 10 ml of a 0.1 M tris buffer solution (pH 8.0), and the dispersion was allowed to stand at a temperature of 60° C. The emulsion was judged to have "good" heat stability when the resin particles remained stably dispersed over a period of 1 month or more, or was judged to have undergone "agglomeration" when swelling of resins to agglomeration was observed within one month from the dispersing.

Modification Stability

Emulsion particles were aminated using a water-soluble carbodiimide and hexamethylenediamine. The resulting aminated particles were dispersed in a boric acid buffer solution (pH 8.2) containing 0.85% sodium chloride. The modification stability was designated as "good" when the resin particles remained stably dispersed over a period of 1 month or more, or designated as "agglomeration" when agglomeration of particles was observed within one month after the dispersing.

In Table 2 below, the abbreviations used in addition to those used in Table 1 have the following meanings:
SSS: Sodium styrenesulfonate
SSPA: Sodium sulfopropylacrylate
AMPS: 2-Acrylamido-2-methylpropanesulfonic acid
3G: Triethylene glycol dimethacrylate
9G: Nonaethylene glycol dimethacrylate
17F: 1H,1H,2H,2H-Heptadecafluorodecyl methacrylate
HEMA: 2-Hydroxyethyl methacrylate

TABLE 2

| Example No. | AA | MAA | SSS | SSPA | AMPS | 3F | 8F | 17F | 3G | 9G | MMA | IBMA | St | HEMA |
|---|---|---|---|---|---|---|---|---|---|---|---|---|---|---|
| Example 9 | 5.0 | — | 0.1 | — | — | — | 10.0 | — | 4.9 | — | 40.0 | 40.0 | — | — |
| Example 10 | — | 10.0 | — | 0.5 | — | — | 10.0 | — | 4.5 | — | 37.5 | 37.5 | — | — |
| Example 11 | 3.5 | — | — | 3.0 | — | — | 10.0 | — | — | 3.5 | 40.0 | 40.0 | — | — |
| Example 12 | 3.5 | — | — | 3.0 | — | — | 10.0 | — | — | 13.5 | 35.0 | 35.0 | — | — |
| Example 13 | 5.0 | — | 0.5 | — | — | — | 6.0 | — | 4.5 | — | 42.0 | 42.0 | — | — |
| Example 14 | 5.0 | — | 0.5 | — | — | 90.0 | — | — | 4.5 | — | — | — | — | — |
| Example 15 | 5.0 | — | — | — | 0.2 | — | 20.0 | — | 4.8 | — | 63.0 | — | — | 7.0 |
| Example 16 | 5.0 | — | 0.5 | — | — | — | 20.0 | — | 4.5 | — | 50.0 | — | 20.0 | — |
| Example 17 | 5.0 | — | — | 0.5 | — | — | — | 5.0 | 4.5 | — | 85.0 | — | — | — |
| Example 18 | 5.0 | — | — | 1.0 | — | — | 40.0 | — | 4.0 | — | 50.0 | — | — | — |
| Comparative Example 9 | — | — | 0.1 | — | — | — | 10.0 | — | 4.9 | — | 42.5 | 42.5 | — | — |
| Comparative Example 10 | 5.0 | — | — | — | — | — | 10.0 | — | 5.0 | — | 40.0 | 40.0 | — | — |
| Comparative Example 11 | 5.0 | — | — | 0.1 | — | 14.9 | — | — | — | — | 40.0 | 40.0 | — | — |
| Comparative Example 12 | 5.0 | — | — | 0.1 | — | — | — | — | 4.9 | — | 45.0 | 45.0 | — | — |
| Comparative Example 13 | 25.0 | — | — | 0.2 | — | — | 20.0 | — | 4.8 | — | 25.0 | 25.0 | — | — |
| Comparative Example 14 | 5.0 | — | — | 15.0 | — | 5.0 | — | — | 5.0 | — | 35.0 | 35.0 | — | — |
| Comparative Example 15 | 5.0 | — | — | 0.2 | — | 20.0 | — | — | 24.8 | — | 25.0 | 25.0 | — | — |

TABLE 3

| Example No. | Average Particle Size (μm) | Mono-Dispersibility (%) | Polymerization Stability | Dispersion Stability | High Polymer Solution Stability | Heat Stability | Modification Stability |
|---|---|---|---|---|---|---|---|
| Example 9 | 0.30 | 5 | good | good | good | good | good |
| Example 10 | 0.25 | 8 | good | good | good | good | good |
| Example 11 | 0.20 | 9 | good | good | good | good | good |

TABLE 3-continued

| Example No. | Average Particle Size ($\mu$m) | Mono-Dispersibility (%) | Polymerization Stability | Dispersion Stability | High Polymer Solution Stability | Heat Stability | Modification Stability |
|---|---|---|---|---|---|---|---|
| Example 12 | 0.22 | 10 | good | good | good | good | good |
| Example 13 | 0.26 | 7 | good | good | good | good | good |
| Example 14 | 0.30 | 5 | good | good | good | good | good |
| Example 15 | 0.24 | 5 | good | good | good | good | good |
| Example 16 | 0.28 | 6 | good | good | good | good | good |
| Example 17 | 0.29 | 7 | good | good | good | good | good |
| Example 18 | 0.26 | 9 | good | good | good | good | good |
| Comparative Example 9 | 0.31 | 12 | good | agglomeration | good | good | — |
| Comparative Example 10 | 0.29 | 8 | good | good | agglomeration | good | good |
| Comparative Example 11 | 0.31 | 28 | good | good | good | agglomeration | agglomeration |
| Comparative Example 12 | 0.32 | 8 | good | good | agglomeration | good | agglomeration |
| Comparative Example 13 | — | — | agglomeration | — | — | — | — |
| Comparative Example 14 | — | — | gelation | — | — | — | — |
| Comparative Example 15 | — | — | gelation | — | — | — | — |

While the invention has been described in detail and with reference to specific embodiments thereof, it will be apparent to one skilled in the art that various changes and modifications can be made therein without departing from the spirit and scope thereof.

What is claimed is:

1. An aqueous resin emulsion having a particle size of from 0.03 to 2 $\mu$m, which is obtained by emulsion copolymerizing a monomer mixture consisting of
   (a) from 60 to 99.8% by weight of an acrylic acid fluoroalkyl ester derivative represented by formula (I)

$$CH_2=CR^1COOR^2(CF_2)_nCFA_2 \qquad (I)$$

wherein $R^1$ represents a hydrogen atom or a lower alkyl group, $R^2$ represents the group $-CH_2-_m$ or the group

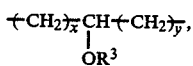

wherein m represents 0 or an integer of from 1 to 12 and x+y is an integer of from 1 to 11, n represents 0 or an integer of from 1 to 12, and $R^3$ represents a hydrogen atom or an acetyl group, and A independently represents a hydrogen atom, a fluorine atom, or $CF_3$,
   (b) from 0.1 to 20% by weight of an acrylic acid derivative represented by formula (II)

$$R^4CH=CR^5COOH \qquad (II)$$

wherein $R^4$ represents a hydrogen atom, a lower alkyl group or a carboxyl group, and $R^5$ represents a hydrogen atom or a lower alkyl group, and
   (c) from 0.1 to 20% by weight of a polyfunctional monomer for internal cross-linking, in an aqueous medium.

2. An aqueous resin emulsion as in claim 1, wherein the particle size is from 0.05 to 2 $\mu$m.

3. An aqueous resin emulsion as in claim 2, wherein the particle size is from 0.1 to 1 $\mu$m.

4. An aqueous resin emulsion as in claim 1, wherein the acrylic acid fluoroalkyl ester derivative is represented by formulae (I-a), (I-b), (I-c), and (I-d)

$$CH_2=CR^1COO(CH_2)_m(CF_2)_nCF_3 \qquad (I\text{-}a)$$

$$CH_2=CR^1COO(CH_2)_m(CF_2)_nH \qquad (I\text{-}b)$$

$$CH_2=CR^1COO(CH_2)_m(CF_2)_nCF(CF_3)_2 \qquad (1\text{-}c)$$

$$CH_2=CR^1COOCH_2CHCH_2(CF_2)_nCF_3 \qquad (I\text{-}d)$$
$$\qquad\qquad\qquad\qquad | \qquad\qquad\qquad$$
$$\qquad\qquad\qquad\quad OR^3$$

where $R^1$, m, n, and $R^3$ are as defined in claim 1, with the proviso that in formula (I-b), n cannot be 0.

5. An aqueous resin emulsion as in claim 4, wherein the acrylic acid fluoroalkyl ester derivative is
$CH_2=C(CH_3)COOCH_2CF_3$,
$CH_2=C(CH_3)COOCH_2(CF_2)_2H$,
$CH_2=C(CH_3)COOCH_2(CF_2)_4H$, or
$CH_2=C(CH_3)COO(CH_2)_2(CF_2)_8F$.

6. An aqueous resin emulsion as in claim 1, wherein the monomer mixture contains from 70 to 95% by weight of the acrylic acid fluoroalkyl ester derivative.

7. An aqueous resin emulsion as in claim 1, wherein the acrylic acid derivative is acrylic acid, methacrylic acid, itaconic acid, or a mixture thereof.

8. An aqueous resin emulsion as in claim 1, wherein the monomer mixture contains from 1 to 15% by weight of the acrylic acid derivative.

9. An aqueous resin emulsion as in claim 1, wherein the polyfunctional monomer for internal cross-linking is a poly(meth)acrylate of an aliphatic polyhydric alcohol.

10. An aqueous resin emulsion as in claim 1, wherein the monomer mixture contains from 1 to 10% by weight of the polyfunctional monomer for internal cross-linking.

11. An aqueous resin emulsion as in claim 1, wherein up to 90% by weight of said acrylic acid fluoroalkyl ester derivative is replaced by an acrylic acid alkyl ester derivative represented by formula (III)

$$CH_2=CR^6COOR^7 \qquad (III)$$

wherein $R^6$ represents a hydrogen atom or a lower alkyl group, and $R^7$ represents an alkyl group having from 1 to 8 carbon atoms.

12. An aqueous resin emulsion as in claim 1, wherein the monomer mixture contains from 70 to 90% by weight of the acrylic acid fluoroalkyl ester derivative, from 1 to 15% by weight of the acrylic acid derivative, and from 1 to 10% by weight of the polyfunctional monomer for internal cross-linking.

* * * * *